Feb. 1, 1966   C. H. BUZZELL   3,233,071
ACTUATING COVER FOR MOTOR CONTROL SWITCH OR THE LIKE
Filed Oct. 18, 1963
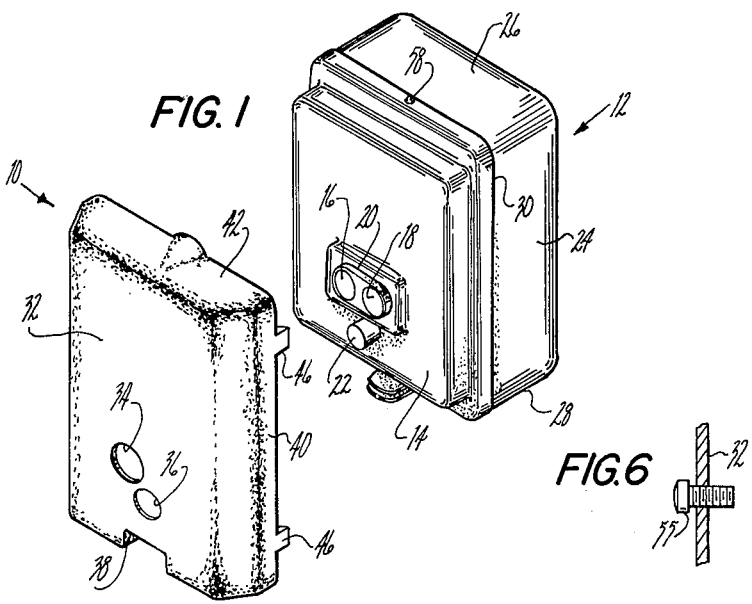
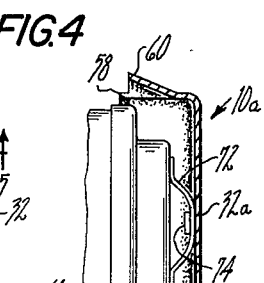
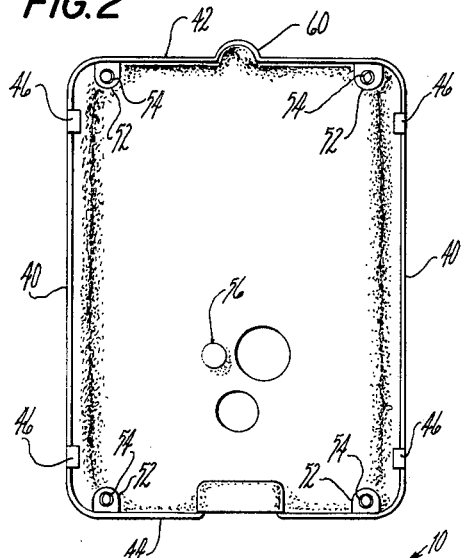
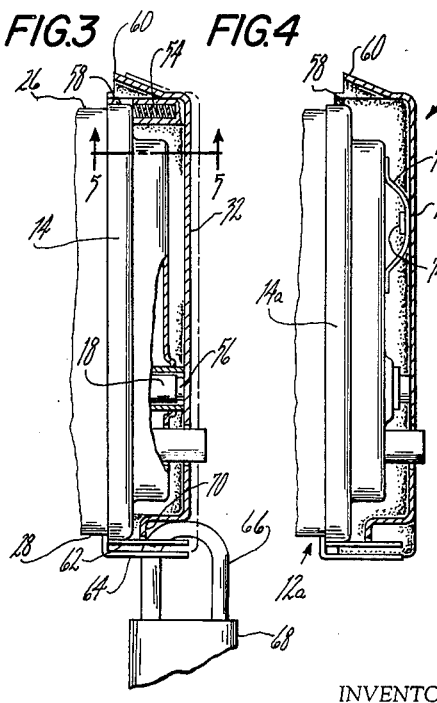
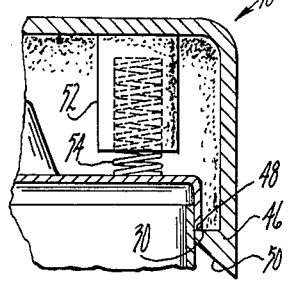
INVENTOR.
CHARLES H. BUZZELL
BY McCormick, Paulding & Huber
ATTORNEYS United States Patent Office 3,233,071
Patented Feb. 1, 1966

3,233,071
ACTUATING COVER FOR MOTOR CONTROL
SWITCH OR THE LIKE
Charles H. Buzzell, 12 Thompson St., Rockville, Conn.
Filed Oct. 18, 1963, Ser. No. 317,266
13 Claims. (Cl. 200—172)

This invention relates generally to electrical switches and, more specifically, to an actuating cover usable to particular advantage with motor control switches or the like in machine tool installations. Motor control switches employed in machine tool installations are provided conventionally with "start" and "stop" buttons which may carry distinguishing colors, but the switches are otherwise lacking in safety provisions for sure and immediate emergency "shut-off." The start and stop buttons are conventionally disposed in side-by-side relationship and are comparatively small in actuating area, perhaps approximating the area of one's finger tip. Thus, despite distinguishing colors on the buttons, a machine tool operator in an emergency situation, as when his clothing becomes entangled in working parts of the machine, may encounter serious difficulty and delay in distinguishing between buttons and accomplishing immediate shut-off operation of the switch. Numerous instances are recorded where critical delay has been encountered and even where the start rather than the stop button has been inadvertently actuated resulting in avoidable loss of limb and even life.

The present invention has as its general object the provision of an actuating cover usable with a motor control switch or the like to provide a broad actuating area for a stop button included in the switch, the cover being so constructed that even a glancing blow at any part of its front portion results in stop button actuation and in a sure and immediate emergency shut-off.

The drawing shows three embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Of the drawing:

FIG. 1 is an exploded perspective view illustrating a motor control switch and an actuating cover constructed in accordance with the present invention;

FIG. 2 is a rear view of the actuating cover of FIG. 1;

FIG. 3 is a stepped vertical section showing the actuating cover mounted on a motor control switch;

FIG. 4 is a view similar to FIG. 3 but showing an alternative embodiment of the actuating cover;

FIG. 5 is a fragmentary horizontal section taken generally as indicated at 5—5 in FIG. 3; and FIG. 6 is an enlarged fragmentary sectional view showing an alternative embodiment of a stop button actuating means.

While the invention is not so limited, an actuating cover 10 is shown in FIG. 1 of the drawing in association with a motor control switch 12 provided with a housing which includes a primary cover plate 14. The motor control switch includes start and stop buttons 16, 18, accessible through an opening 20 in the cover plate 14, and a reset button 22. The buttons 16, 18 and 22 are each movable rearwardly on actuation by finger pressure or the like. The housing of the motor control switch 12 extends rearwardly with respect to the buttons 16, 18, 22 and, in addition to the cover plate 14, the said housing includes opposing side walls 24, 24, one shown in FIG. 1, and top and bottom walls 26 and 28. Further, the housing 12 of the motor control switch is generally rectangular viewed from the front and the cover plate 14 thereof has a rear edge surface 30 which is accessible externally and which forms a generally rearwardly facing bearing surface as will be described more fully hereinbelow.

The actuating cover 10 is shown as being of unitary construction and formed of an electrically non-conductive plastic, but the construction may obviously vary widely in form. A front portion 32 of the cover 10 defines a broad generally forwardly facing actuating surface and said portion is at least approximately coextensive with the aforesaid switch housing. An access opening 34 in the front portion is provided for the start button 16, and a similar opening 36 receives the reset button 22 when the cover is mounted upon the motor control switch 12. A rearwardly extending recess 38 at the bottom of the front portion 32 has a purpose to be described hereinbelow.

Spaced apart rearwardly extending portions of the actuating cover 10 include integrally formed opposing side walls 40, 40 and top and bottom walls 42, 44, FIG. 2. Also included in said rearwardly extending portions are small latching members 46, 46 which define forwardly facing bearing surfaces 48, 48. The latching members 46, 46 are provided in pairs in the embodiment shown and each pair is arranged in vertically spaced relationship on a side wall 40 of the actuating cover. As best shown in FIG. 5, each latching member 46 has an inclined rear surface 50 and said surfaces are adapted to engage side portions of the cover plate 14 when the actuating cover 10 is moved rearwardly from the position shown in FIG. 1. Engagement of the inclined surfaces 50, 50 on the latching members 46, 46 results in a camming action, the said members being sufficiently flexible laterally to provide for a slight spreading and a snap action engagement of the surfaces 48, 48 thereon with the aforesaid rear surface 30 on the cover plate 14. Thus, referring again to FIG. 5, the actuating cover 10 may be mounted upon the motor control switch 12 with the forwardly facing surfaces 48, 48 in engagement or at least approximately in engagement with the rearwardly facing edge surface 30. Said rearwardly facing edge surface 30 thus defines spaced apart rearwardly facing bearing surfaces.

The actuating cover of the present invention also includes a resilient biasing means adapted for engagement with the motor control switch whereby to urge the cover to an inoperative forward position. In FIGS. 1–3 and 5 the said biasing means is shown as comprising a plurality of four rectangularly spaced spring seats 52, 52 and four corresponding coil springs 54, 54. The spring seats 52, 52 are arranged in pairs respectively on the top and bottom walls 42 and 44 of the cover 10, the seats 52, 52 of each pair being spaced horizontally adjacent the ends of said walls as best shown in FIG. 2. Each seat includes a small cylindrical opening adapted to receive and hold a coil spring 54.

As best shown in FIG. 5, each of the springs 54 extends rearwardly from its seat so as to engage the motor control switch, and, more specifically, to engage rectangularly spaced areas on the cover plate 14 of the switch 12. The springs 54, 54 collectively urge the cover 10 forwardly to the inoperative position established by engagement of the aforesaid bearing surfaces 48, 48 and the rear edge 30 of the cover plate 14.

The cover 10 is also movable rearwardly. As best shown in FIG. 3, the springs 54, 54 can be compressed by pressure upon the actuating surface on the front portion 32 of the cover to move the same from its forward broken line position to the rearward position shown. In the rearward position shown, the cover serves to actuate the stop button 18 on the motor control switch 12. A means is provided on the front cover portion 32 and such means may take the form of a small rearwardly extending projection or member 56. The projection or lug 56 is shown formed integrally on the rear surface of the front portion 32 of the cover in registry with the stop button 18 so as to move the same rearwardly on rearward movement of the cover 10.

While the cover is shown in FIG. 3 as being moved rearwardly in a generally linear sliding action, the dimensions of the same are such that a pivoting action will also result in actuation of the stop button 18. That is, rearward movement of either end or side portion of the cover will result in actuation of the said button. Moreover, a diagonal tilting action may result from rearward movement of a corner portion of the cover and such action will also result in actuation of the stop button.

The means for actuating the stop button 18 may also take the form shown in FIG. 6. Here, the said means is adapted for adjustment forwardly and rearwardly with respect to the front portion 32 of the cover 10 and is shown formed separately from the cover as a small bolt 55. This arrangement is found to be advantageous in adapting an actuating cover such as 10 for use on various types of motor control switches.

Still referring to FIG. 3, it will be observed that a locking means is provided for holding the actuating cover 10 in a rearward position wherein the stop button 18 is actuated. The motor control switch shown has provision for the attachment of its cover plate 14 to the main portion of the housing by means of a small lug and opening 58, accommodated by an outwardly flaring portion 60 of the actuating cover 10, FIGS. 2 and 3. At a lower portion, cover plate 14 is provided with a forwardly extending lug or staple 62 and a mating lug or staple 64 is provided on the main portion of the switch housing at the bottom wall 28. Said lugs or staples 62, 64 have aligned apertures through which a lock part may be entered to maintain a cover plate 14 in a rearward position. As shown, said lock part takes the form of a bow or shackle 66 of a padlock 68. Forwardly facing surface 70 in the recess 38 in the front portion 32 of the cover 10 is so arranged with respect to the openings in the lugs or staples 62, 64 as to provide for engagement of the bow or shackle 66 therewith when the latter is inserted in said apertures. As shown, the bow or shackle 66 holds the cover 10 in its rearward position by engagement with said surface 70 and the motor control switch 12 is thus locked in its stop or off position. On removal of the padlock, the cover plate 14 is maintained in position by the lug and opening 58, and by additional means if so desired, and the actuating cover 10 is free for operation as aforesaid.

In FIG. 4 there is shown an alternate embodiment of the invention wherein the actuating cover 10a may be identical with that described above except for the provision of a second type of resilient biasing means in place of the aforedescribed coil springs 54, 54 and seats 52, 52. The resilient biasing means in FIG. 4 takes the form of a leaf spring 72 disposed adjacent the rear surface of the front portion 32a of the cover 10a and in engagement with said surface and the front surface of the cover plate 14a on the motor control switch 12a. Said leaf spring may be held loosely by means of an opening at a center portion and a small lug 74 on the actuating cover.

Operation of the cover 10a of FIG. 4 may be identical with that described above for the actuating cover 10.

The invention claimed is:

1. An actuating cover for use with a motor control switch or the like which includes a rearwardly movable stop button at a front portion and a housing which extends rearwardly with respect to the stop button and which defines at least one generally rearwardly facing bearing surface; said actuating cover comprising a front portion, at least one rearwardly extending portion connected with said front portion, and at least one resilient biasing means, said front portion being at least approximately coextensive with the front of the switch housing and serving to define a broad generally forwardly facing actuating surface, said rearwardly extending portion having a generally forwardly facing bearing surface thereon and said portion being arranged for engagement of said bearing surface with the aforesaid rearwardly facing bearing on said switch housing when the cover is mounted on the switch, said resilient biasing means being supported by said actuating cover for engagement with the motor control switch when the cover is so mounted whereby to urge the cover to an inoperative forward position as limited by engagement of said generally rearwardly and forwardly facing bearing surfaces, said cover being movable rearwardly from said forward position against the urging of said biasing means by pressure applied to said actuating surface on its said front portion, and said front cover portion including means engageable with said stop button and operable to move the same rearwardly on such rearward movement of the cover.

2. An actuating cover for use with a motor control switch or the like which includes a rearwardly movable stop button at a front portion and a housing which extends rearwardly with respect to the stop button and which defines at least two spaced externally accessible and generally rearwardly facing bearing surfaces; said actuating cover comprising a front portion, at least two spaced rearwardly extending portions connected with said front portion, and at least one resilient biasing means, said front portion being at least approximately coextensive with the front of the switch housing and serving to define a broad generally forwardly facing actuating surface, said spaced rearwardly extending portions each having a generally forwardly facing bearing surface thereon and said portions being arranged for engagement of said bearing surfaces respectively with the aforesaid rearwardly facing bearing surfaces on said switch housing when the cover is mounted on the switch, said resilient biasing means being supported by said actuating cover for engagement with the motor control switch when the cover is so mounted whereby to urge the cover to an inoperative forward position as limited by engagement of said generally rearwardly and forwardly facing bearing surfaces, said cover being movable rearwardly from said forward position against the urging of said biasing means by pressure applied to said actuating surface on its said front portion, and said front cover portion including means engageable with said stop button and operable to move the same rearwardly on such rearward movement of the cover.

3. An actuating cover for a motor control switch or the like as set forth in claim 2 wherein the motor control switch includes a start button at a front portion, and wherein the said front portion of the actuating cover is provided with an access opening in registry with said start button.

4. An actuating cover for a motor control switch or the like as set forth in claim 3 and including a locking means engaged with the motor control switch and the actuating cover and operable to hold the latter in a rearward position whereat the stop button is engaged and actuated by said means on the front cover portion.

5. An actuating cover for a motor control switch or the like as set forth in claim 4 wherein said locking means includes an apertured lug on the motor control switch, a lock having a part which extends through the aperture in said lug, and a part of said front portion of the actuating cover which lies adjacent and is engaged by said lock part when the latter is entered in the said aperture, said lock part serving to urge said front cover portion rearwardly whereby to hold the actuating cover in its said rearward position.

6. An actuating cover for a motor control switch or the like as set forth in claim 3 wherein said stop button engageable means takes the form of a small rearwardly projecting member mounted on said front cover portion in registry with the stop button.

7. An actuating cover for a motor control switch or the like as set forth in claim 6 wherein said rearwardly projecting member is formed integrally with said front cover portion.

8. An actuating cover for a motor control switch or the like as set forth in claim 6 wherein said rearwardly projecting member is separate from said front cover portion and adapted for forward and rearward adjustment relative thereto.

9. An actuating cover for a motor control switch or the like as set forth in claim 3 wherein said resilient biasing means includes four generally rectangularly spaced coil springs supported by said actuating cover for engagement with the motor control switch.

10. An actuating cover for a motor control switch or the like as set forth in claim 3 wherein said resilient biasing means includes at least one spring of the leaf type mounted on and disposed behind said front portion of the actuating cover for engagement with the motor control switch.

11. An actuating cover for a motor control switch or the like as set forth in claim 3 wherein said spaced rearwardly extending cover portions include small latching members which define said forwardly facing bearing surfaces and which exhibit sufficient lateral flexibility for engagement of said surfaces in a snap action with said rearwardly facing bearing surfaces on the switch housing.

12. An actuating cover for a motor control switch or the like as set forth in claim 11 wherein said switch housing is generally rectangular viewed from the front with opposing side and top and bottom walls and includes a primary front cover plate having rear edge surfaces which form the aforesaid rearwardly facing bearing surfaces, wherein said actuating cover is attachable to the switch with its said front portion spaced forwardly from said primary cover plate, and wherein said rearwardly extending cover portions include connected opposing side and top and bottom walls disposed adjacent corresponding switch housing walls, the aforesaid latching members being arranged to extend rearwardly from opposing walls of said rearwardly extending cover portions.

13. An actuating cover for a control switch or the like as set forth in claim 12 wherein the actuating cover is of unitary construction and formed of an electrically non-conductive material.

References Cited by the Examiner
UNITED STATES PATENTS 1,706,518 3/1929 Blough _____ 200—42
3,081,390 3/1963 Lasar _____ 200—172

KATHLEEN H. CLAFFY, *Primary Examiner.*

BERNARD A. GILHEANY, *Examiner.*